United States Patent [19]

Weir

[11] 4,262,923
[45] Apr. 21, 1981

[54] MULTI-PURPOSE OVER-THE-HIGHWAY TRAILER ARRANGEMENTS

[75] Inventor: Gary L. Weir, Denton, Tex.

[73] Assignee: Pullman Incorporated, Chicago, Ill.

[21] Appl. No.: 961,326

[22] Filed: Nov. 16, 1978

[51] Int. Cl.³ .............................................. B62D 21/00
[52] U.S. Cl. .............................. 280/423 B; 280/81 R; 280/404; 280/656
[58] Field of Search ............. 280/423 B, 5, 656, 81 R, 280/81 B, 81 A, 415 B, 404, 789, 80 R, 80 A, 80 B, 43, 490 R

[56] References Cited

U.S. PATENT DOCUMENTS

| 2,466,938 | 4/1949 | Evans | 280/33 |
|---|---|---|---|
| 2,663,574 | 12/1953 | Martin | 280/423 B |
| 2,741,489 | 4/1956 | Bigge | 280/44 |
| 2,772,892 | 12/1956 | Hake | 280/405 A |
| 2,776,146 | 1/1957 | Marino | 280/423 B |
| 2,871,027 | 1/1959 | Brockman | 280/423 B |
| 2,919,928 | 1/1960 | Hoffer | 280/81 R |
| 2,982,563 | 5/1961 | Gregg | 280/81 |
| 3,123,380 | 3/1964 | Grim | 280/404 |
| 3,154,319 | 10/1964 | Martin | 280/104.5 |
| 3,246,914 | 4/1966 | Cunha | 280/407 |
| 3,282,601 | 11/1966 | Harbers | 280/81 |
| 3,298,706 | 1/1967 | Lyall | 280/81 |
| 3,697,098 | 10/1972 | Fisher | 280/415 R |
| 3,838,868 | 10/1974 | Robertson | 280/81 R |

Primary Examiner—John J. Love
Assistant Examiner—Randall A. Schrecengost
Attorney, Agent, or Firm—Richard J. Myers

[57] ABSTRACT

The plurality of multi-purpose trailer arrangements and combinations are provided to carry large and heavy loads for over-the highway transportation, the arrangements providing for greater versatility and load distribution necessary to meet highway requirements.

11 Claims, 7 Drawing Figures

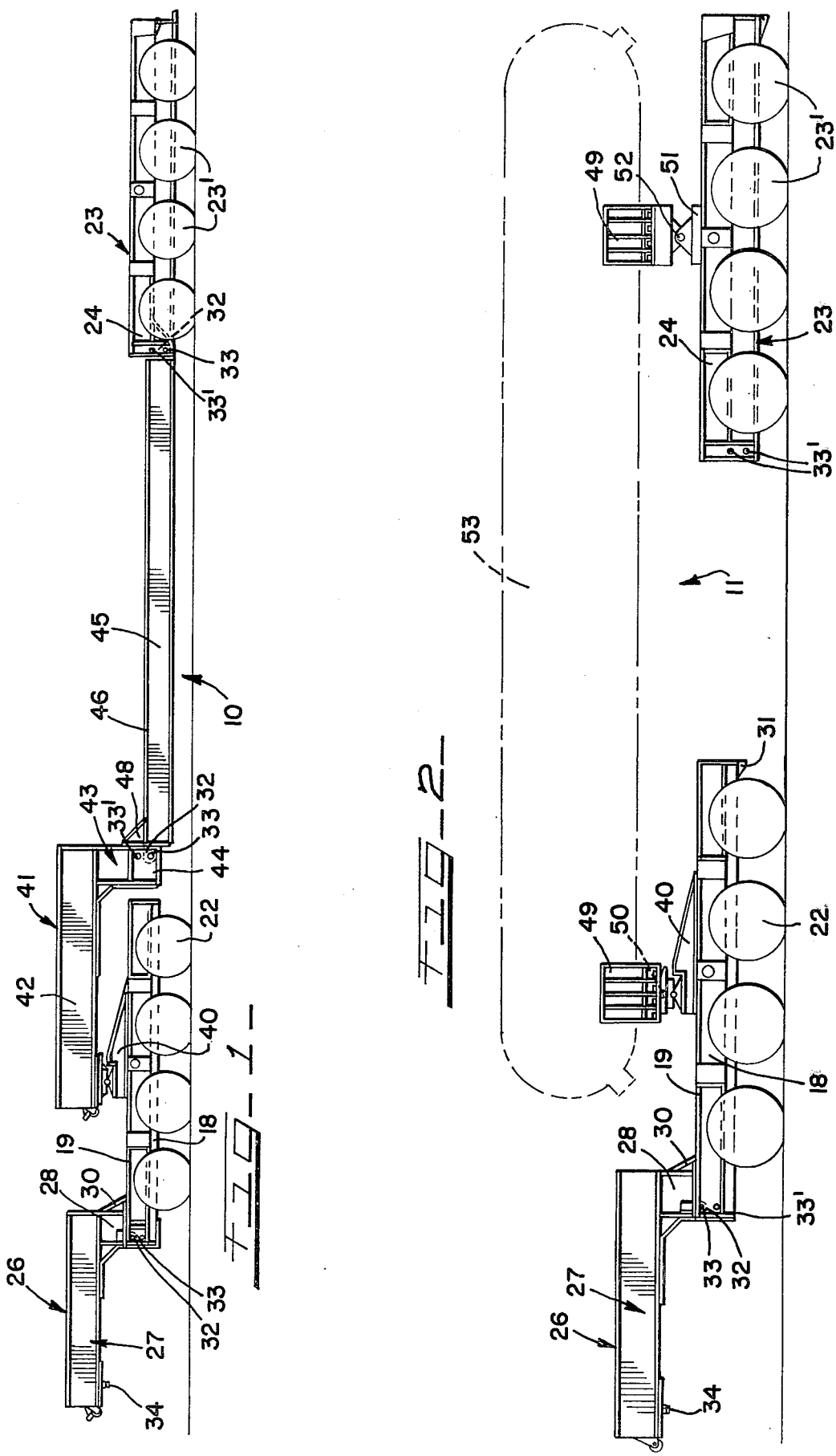

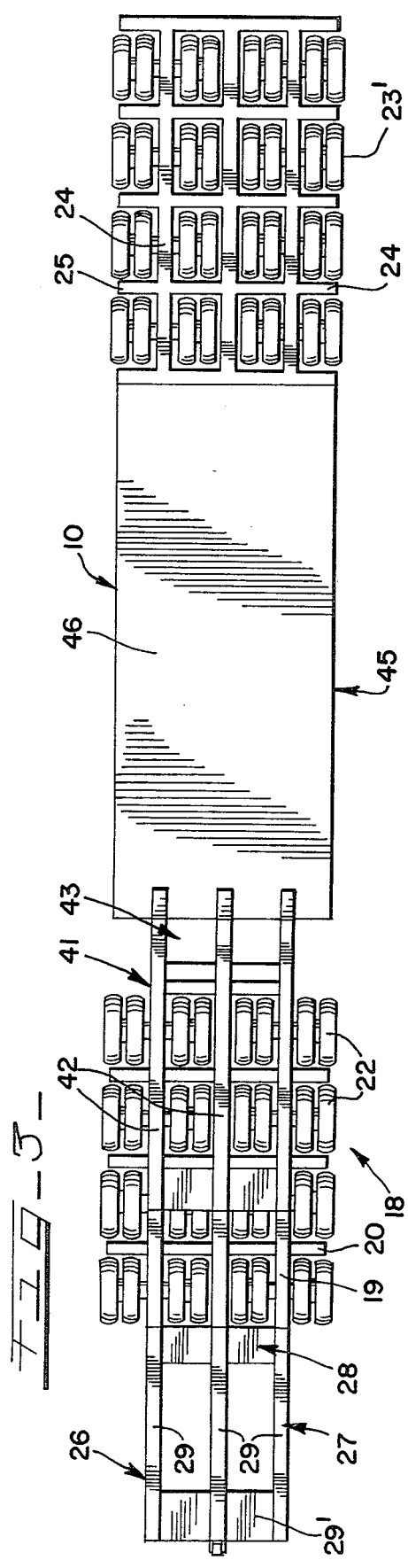
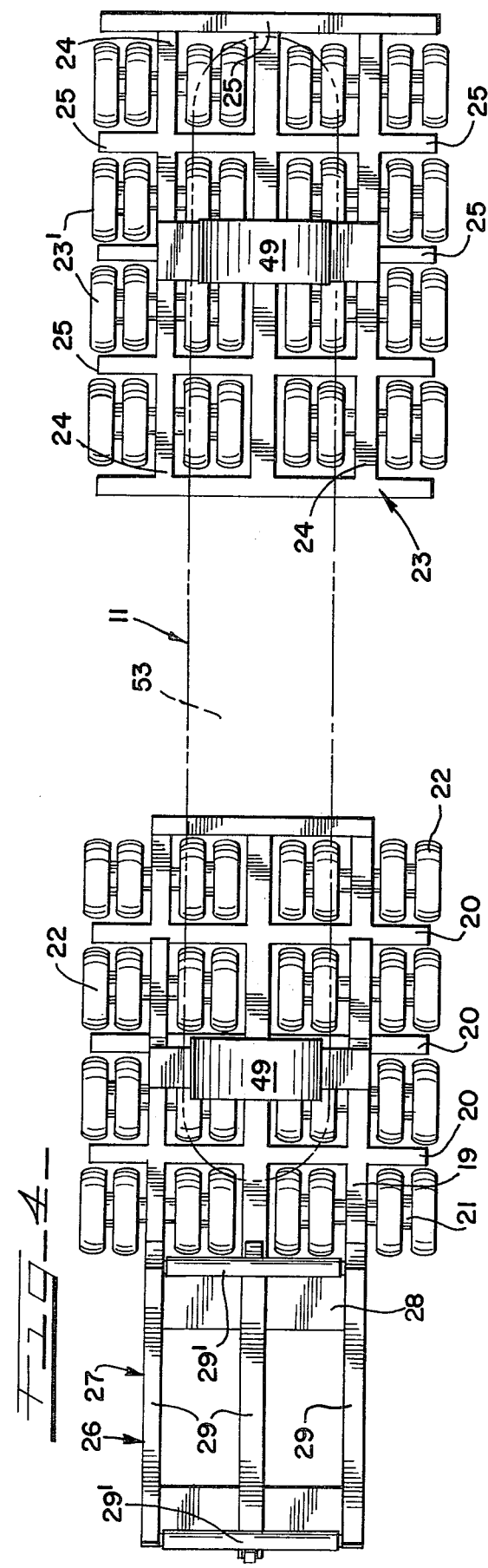

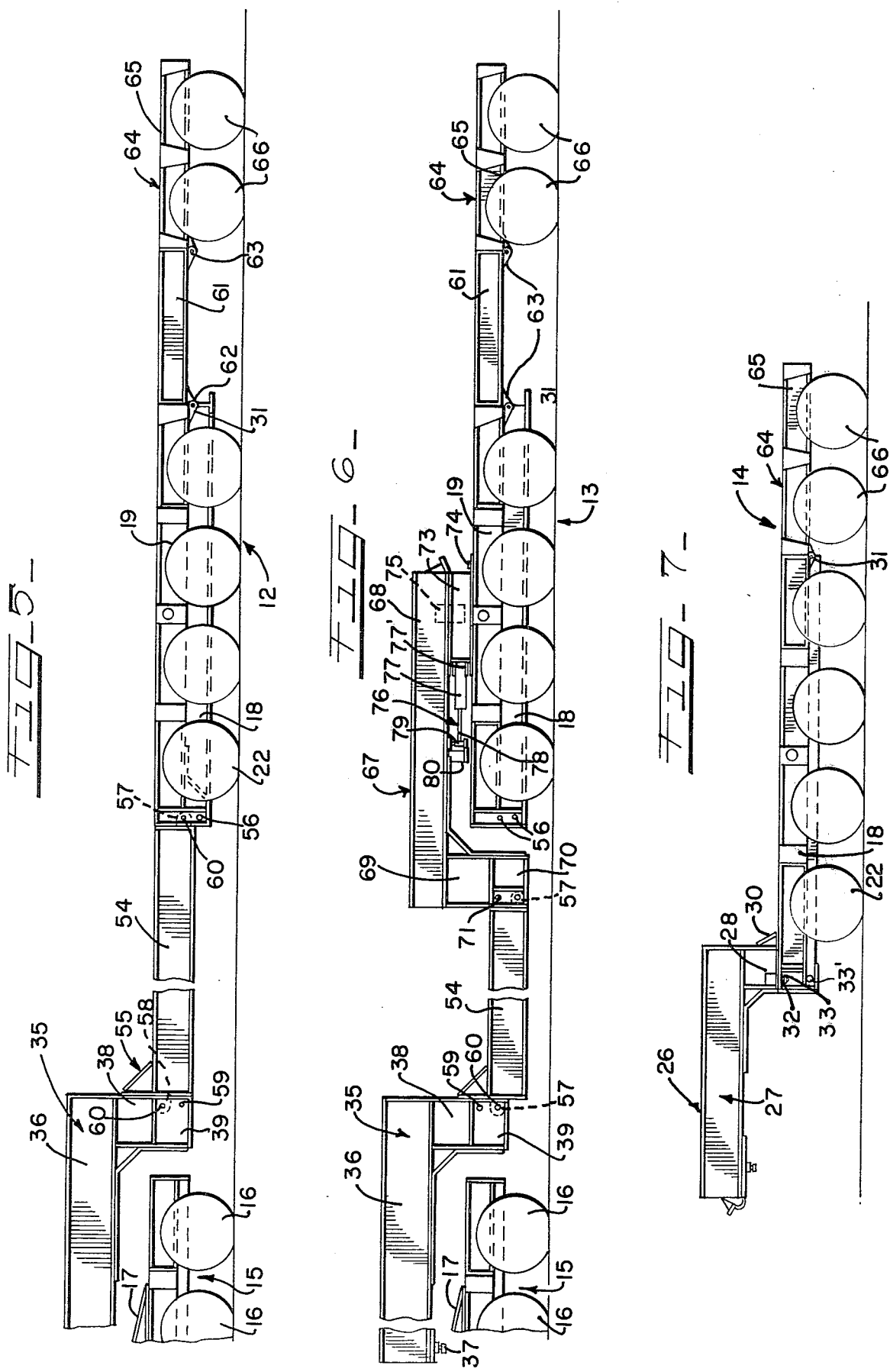

MULTI-PURPOSE OVER-THE-HIGHWAY TRAILER ARRANGEMENTS

BACKGROUND OF THE INVENTION

1. Field of the Invention

The present invention generally relates to transportation vehicles of the trailer type normally transported over the highway by means of tractor vehicles. More specifically, the invention relates to over-the-highway trailers particularly designed for multi-purpose use and including various arrangements and combinations for accommodating exceptionally large and bulky loads with the arrangements all being designed to meet the legal load distribution requirements of the various highway systems.

2. Description of the Prior Art

Patents pertinent to the present invention include U.S. Pat. Nos. 2,466,938 issued Apr. 12, 1949; 2,741,489 issued Apr. 10, 1956; 2,982,563 issued May 2, 1961; 3,154,319 issued Oct. 27, 1964; 3,282,601 issued Nov. 1, 1966; 3,298,706 issued Jan. 6, 1967 and 3,697,098 issued Oct. 10, 1972. The present invention is an improvement over the aforementioned structures disclosed in these patents.

SUMMARY OF THE INVENTION

In the present invention a primary vehicle includes a first gooseneck structure which is removably connected to a wheeled supporting structure comprising a plurality of longitudinally and transversely spaced pairs of wheels particularly designed to carry large and bulky over-the-highway loads. The primary vehicle in one arrangement is provided with a fifth wheel to which a saddle is connected. This arrangement includes a second vehicle similar to the first vehicle which is also provided with a pivotally mounted saddle such that the two saddles of the arrangement support a large and elongated tank for transport.

In another arrangement the primary vehicle and gooseneck construction in turn supports on its fifth wheel a second gooseneck structure which is removably connected to an elongated flat low bed structure which at its rearmost end is supported on a secondary vehicle similar to that of the aforementioned arrangement. In another arrangement a gooseneck structure in turn is removably connected to an elongated flatbed in turn removably connected to the wheeled structure of the first or primary vehicle which forms substantially the central wheel supporting structure of the vehicle with the gooseneck being supported on the conventional type of over-the-highway tractor. To spread out the loads over the highway the arrangement described may also include a relatively short flatbed platform construction pivotally or hingedly supported on a wheeled dolly positioned at the end of the arrangement.

Another modification includes a gooseneck structure removably connected to a primary vehicle which in turn is hingedly connected to a wheeled dolly providing a continuation of the lowbed arrangement on which the load to be carried is supported. A further modification or arrangement includes a first gooseneck structure removably connected to the flatbed platform or support which at its other end is connected to a second gooseneck structure extending in a direction opposite the extension of the first gooseneck structure. The second gooseneck structure and vehicle are interconnected for relative turning movement and include fluid extensible means between the structures to effectuate steering movement of one relative to the other. This particular arrangement also includes the hinged, relatively shorter platform which is also hingedly connected to an end wheel dolly, thus providing for an extension of the load carrying ability as well as the weight distribution relative to the highway.

BRIEF DESCRIPTION OF THE DRAWINGS

FIG. 1 is a side elevational view of a first trailer arrangement including a pair of interconnected gooseneck trailer vehicle;

FIG. 2 is a side elevational view of another trailer arrangement including a primary vehicle with a gooseneck connected thereto and including a tank saddle for supporting the forward end of a fluid carrying tank, the rear end of the same being supported on the tank saddle of another vehicle construction;

FIG. 3 is a plan view of the vehicle arrangement shown in FIG. 1;

FIG. 4 is a plan view of the vehicle assembly shown in FIG. 2;

FIG. 5 is a side elevational view of another trailer vehicle combination including a gooseneck construction, an elongated flat platform and multiple wheel structures for supporting the same;

FIG. 6 is a side elevational view of another trailer vehicle combination including a platform structure connected to first and second gooseneck constructions, one of which is interconnected for turning movement with a multi-wheel vehicle assembly; and FIG. 7 is a side elevational view of another trailer vehicle arrangement including a gooseneck structure, platform and interconnected dolly arrangement.

DESCRIPTION OF THE VARIOUS TRAILER ARRANGEMENTS

FIGS. 1 and 3 disclose a trailer vehicle combination or arrangement designated by the reference character 10. FIGS. 2 and 4 show another arrangement which is designated by the reference character 11. FIG. 5 discloses a side elevational view of another trailer arrangement designated 12, FIG. 6 discloses a side elevational view of still another trailer arrangement designated 13, and FIG. 7 discloses a side elevational view of still another trailer arrangement designated by the reference character 14. As best shown in FIGS. 5 and 6, the trailer arrangements disclosed are towed over the highway by means of a conventional tractor 15 having suitable drive wheel 16 supporting a fifth wheel structure generally designated at 17 which is of course of conventional design.

As shown in the drawings, the invention provides for first and second wheel frames. The primary or first wheel frame 18 includes horizontal longitudinally extending frame members 19 connected to transverse frame members 20, the wheel frame 18 being supported on axles 21 by a multiple number of wheels 22 as best shown in FIGS. 3 and 4. Thus the longitudinal and transverse frame members of the first frame are supported on the wheels 22 for primarily supporting the heavy loads on the various frames and arrangements in transporting the same over the highway. The second wheel frame 23 is similar to the primary first wheel frame 18 and includes horizontal longitudinal frame members 24 and transverse frame members 25 similarly supported on a multiplicity of wheels designated at 23'.

The first wheeled frames 18 are connected at the forward end to first gooseneck draft structures 26 comprising a horizontal beam structure 27 fixedly connected to a vertical beam structure 28. The gooseneck structure 26 as best shown in FIGS. 1–4 includes horizontal beam members 27 connected to a vertical beam 28. The gooseneck structure 26 further includes horizontally extending longitudinal beams 29 suitably connected by transverse beams 29'. Each of the gooseneck structures 26 also includes a diagonal support bracket 30 rigidly fixed to the vertical beam structure 28. The first wheeled frames 18 at the rearmost ends are provided on opposite sides thereof with hinge members 31, the purpose of which will be presently described. As best shown in FIGS. 1, 2 and 7 the gooseneck structure 26 includes connector projections 32 suitably supported on the beams 28 which are in registry with openings 33' provided in the outer longitudinal frame members 24 of the first wheel frame 18. By means of pins 33 extending through the openings 33' and through the connector projections 32 the gooseneck structure 26 is removably connected to the first wheeled frame 18 as desired. Each of the first gooseneck draft structures 26 are also provided with a downwardly projecting kingpin 34 which is adapted to be engaged with the fifth wheel 17 of the over-the-highway tractor 15.

A second gooseneck structure 35 is disclosed in FIGS. 5 and 6. The gooseneck structure disclosed in FIGS. 5 and 6 includes longitudinal beams 36 which support a downwardly projecting kingpin 37. The structure 35 also includes a vertical beam assembly 38 having a downwardly boxlike extension 39.

A third gooseneck structure 41, which is similar to the gooseneck 35, is shown in FIG. 1 and includes a plurality of longitudinal beams 42 connected to a vertical beam structure 43 having a downward extension 44 connected thereto. The arrangement shown in FIG. 1 further includes an elongated lowbed platform 45 having a support surface 46. The diagonal bracket 48 is suitably connected to the horizontal beam structure 46. In this particular arrangement connector projections 32 project outwardly from the support platform 46 on opposite sides thereof and are in registry with openings 33' in the structure 43 and extension 44 with pins 33 releasably securing the platform 45 to the third gooseneck structure 41. The gooseneck structure 41 is suitably supported in FIG. 1 on the fifth wheel structure 40 of the primary wheeled frame 18.

As best shown in FIGS. 2 and 3 tank saddles 49 support a tank or vessel 53. The forward saddle 49 includes a suitable kingpin 50 which supports the front of the tank on the fifth wheel structure 40. The rear of the tank is supported on the saddle 49 which is pivotally connected as indicated at 52 through a bracket 51 supported on the second wheel frame 23.

The rear end of the platform 45 as again shown in FIG. 1 is supported by the second wheel frame 23 by means of the pins 33 which extend through the openings 33' for removably connecting the rear end of the platform 45 to the wheeled frame 23. Referring now to FIG. 5 the gooseneck structure 35 is suitably connected to a platform 54 which includes forwardly and rearwardly extending connector projections or ears 57 and 58. Openings 59 are provided in the extension 39 and are adapted to register with the ears 58 which in the arrangement of FIG. 5 disclose pins 60 adjustably connecting the forward end of the platform 54 to the beam structure 38. The rear of the beam structure 54 is supported on the first wheel frame 18 and in this arrangement the openings 56 are provided on the frame 18 to register with the ears 57 and be connected thereto by means of pins 60 in removable fashion for connecting the platform 54 to the first frame 18. In FIG. 5 a relatively short section of platform 61 is hingedly connected to the hinge members 31 at its forward end and at its rearward end is provided with hinge members 63 hingedly connected to a wheeled dolly 64 having a flat deck 65 and being supported on dolly wheel 66. Thus the flat platform section 61 and dolly provide an extension for receiving the load and for supporting the same to effectuate proper and legal weight distribution on the highway. The position of the platform 54 relative to the gooseneck structure 36 and first wheeled frame 18 may be changed vertically since the holes are so positioned in the respective members to permit vertical adjustment.

Referring now to the arrrangement of FIG. 6 the gooseneck structure 35 is connected to the platform 54 by connecting the pin 60 through the lowermost opening 59 of the holes in the members 39. Similarly the projecting ears 57 are connected to a vertical beam structure 69 having openings 71 by means of pins 72. The gooseneck draft structure generally designated at 67 in FIG. 6 includes the horizontal longitudinal beam 68 and vertical beam structure 69 which is provided with a lower extension 70 in a manner similar to the structure shown in the gooseneck 35. The first wheel frame 18 is provided to support the gooseneck structure 67 which extends in a direction opposite to the direction of extension of the gooseneck structure 35. The support structure 73 is firmly connected to the top of the first wheeled frame 18 by means of bolts 74. A vertical pivot 75 connects the support structure 73 to the horizontal beam 68 so that the frame 18 can pivot relative to the gooseneck structure 67 or vice versa. In the arrangement of FIG. 6 the steering mechanism 76 is generally designated and includes a pair of hydraulic cylinders 77 which are pivotally connected to the support structure 73 as indicated at 77'. The cylinder 77 may also be actuated by pneumatic means and include piston rods 78 which project outwardly for reciprocation and are connected at their ends to pivot means 79 provided on brackets 80 in turn rigidly connected to the horizontal beams 68.

The arrangement shown in FIG. 7 includes the gooseneck structure generally designated at 26 and discloses the disconnectability of the same from the first wheel frame 18. In this particular arrangement additional supporting surface and load distribution is obtained by the utilization of the dolly 64 which is hingedly connected as indicated in FIG. 7 to the brackets 31 provided at the rear end of the first wheel frame.

Thus it is believed clear that five different combinations and arrangements of a trailing vehicle have been disclosed for multiple use application depending upon the type of load which is to be carried, the size, and the weight thereof. In FIGS. 1 and 3 the arrangement 10 discloses the first and second gooseneck structures adapted to be connected together as trailing vehicles and being adapted to being connected at its forward gooseneck structure to the over-the-highway tractor. The adjustability of the platform relative to the gooseneck structures and trailing wheeled frame is apparent so that the vertical height adjustment may be arranged as desired. FIGS. 2 and 4 disclose the arrangement 11 wherein the first and secondary vehicles support a tank structure on the saddles disclosed which in turn permit the utilization of the first gooseneck structure which is adapted to be connected to the over-the-highway tractor. Again the multiple utilization of the various units and their adjustability is readily apparent. FIGS. 5 and 7 disclose the utilization of the adjustable gooseneck with the platform, the first wheeled frame structure, and the adaptation of additional platforms and a dolly construction disposed at the rear of the unit to achieve multiple use adaptability.

In FIG. 6 the adaptability of the arrangement is also apparent. In this case the steering arrangement being added in the combination of the combined gooseneck structure afforded by the interconnection of the structures 35 and 67. The hydraulic or pneumatic steering arrangement disclosed is conventional in the art and is not described in detail. However, it does illustrate the versatility of the arrangement disclosed, again providing for maximum use and adaptation to the various load structures to be transported.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

I claim:

1. A low bed transporter vehicle arrangement adapted to be connected to a fifth wheel structure of an over-the-highway tractor comprising:
    a gooseneck structure having a horizontal beam structure and a vertical beam structure,
    king pin means on said horizontal beam structure and adapted to be connected to said fifth wheel structure,
    a first wheeled longitudinally extending and horizontally supporting frame structure spaced rearwardly of said gooseneck structure and having a forward portion,
    coupling means releasably connecting said first wheeled frame structure to said gooseneck structure,
    said coupling means including a first connecting portion on said gooseneck vertical beam and a second connecting portion on said forward portion of said first wheeled frame structure,
    said first and second connecting portions presenting abutting overlapping surface portions,
    lock means releasably coupling said overlapping surface portions to permit direct longitudinal separation in the same horizontal plane of said first wheeled frame structure and said gooseneck structure facilitating quick disconnect for changing and adding to the arrangement,
    a second wheeled longitudinally extending and horizontally supporting frame structure space rearwardly of said first wheel frame structure,
    interconnecting means releasably connecting said second wheeled frame structure to said first wheeled frame structure further facilitating quick disconnect for changing and adding to the arrangement,
    said interconnecting means including a second fifth wheel mounted on said first wheeled frame structure, and a load transport means connected with and extending between second fifth wheel of said first wheeled frame structure and said second wheeled frame structure,
    said second fifth wheel having a pivotal connection about a vertical axis with said load transport means,
    said interconnecting means further comprising a second gooseneck structure having a second horizontal beam structure and a second vertical beam structure,
    a second king pin means on said second horizontal beam structure engageable with said second fifth wheel,
    said second wheeled frame structure including a forward portion,
    said load transport means including a trailer platform having forward and rear portions,
    second coupling means releasably connecting said second vertical beam structure of said gooseneck structure to said forward portion of said trailer platform and third coupling means releasably connecting said rear portion of said trailer platform to said forward portion of said second wheeled frame structure, and,
    said second coupling and said third coupling means each including means for vertically adjusting the height of said platform relative to, said wheeled frames.

2. The invention in accordance with claim 1, and
    said second coupling means including a first connecting portion on said second vertical beam structure and a second connecting portion on said forward portion of said trailer platform,
    said first and second connecting portions of said second coupling means presenting abutting overlapping surface portions,
    second lock means releasably coupling said first and second connecting portions of said second coupling means to permit direct longitudinal separation in the same horizontal plane of said second gooseneck structure and said trailer platform facilitating quick disconnect for changing and adding to the arrangement,
    said third coupling means including a first connecting portion on said rear portion of said trailer platform and a second connecting portion on said forward portion of said second wheeled frame structure,
    said first and second connecting portions of said third coupling means presenting abutting overlapping surface portions, and
    third lock means releasably coupling said first and second connecting portion of said third coupling means to permit direct longitudinal separation in the same horizontal plane of said trailer platform and said second wheeled frame structure facilitating quick disconnect for changing and adding to the arrangement.

3. A low bed transporter vehicle arrangement adapted to be connected to a fifth wheel structure of an over-the-highway tractor comprising:
    a gooseneck structure having a horizontal beam structure and a vertical beam structure,
    king pin means on said horizontal beam structure and adapted to be connected to said fifth wheel structure,
    a first wheeled longitudinally extending and horizontally supporting frame structure spaced rearwardly of said gooseneck structure and having a forward portion, coupling means releasably connecting said first wheeled frame structure to said gooseneck structure, said coupling means including a first connecting portion on said gooseneck vertical beam and a second connecting portion on said forward portion of said first wheeled frame structure, said first and second connecting portions presenting abutting overlapping surface portions, lock means releasably coupling said overlapping surface portions to permit direct longitudinal separation in the same horizontal plane of said first wheeled frame structure and said gooseneck structure facilitating quick disconnect for changing and adding to the arrangement, a second wheeled longitudinally extending and horizontally supporting frame structure space rearwardly of said first wheel frame structure, interconnecting means releasably connecting said second wheeled frame structure to said first wheeled frame structure further facilitating quick disconnect for changing and adding to the arrangement, said forward portion of said first wheeled frame structure defining said connecting portions of said coupling means including an elongated removable platform between said first wheeled frame structure and said gooseneck structure and, said platform having a rear section cooperating with the remainder of the first wheeled frame structure to define anchor means providing a releasable connection between said platform and said first wheeled frame structure.

4. The invention in accordance with claim 3, and said second wheeled frame structure including a trailing wheeled dolly.

5. The invention in accordance with claim 4, and said dolly being hingedly connected with said first frame structure.

6. The invention in accordance with claim 5, and a section of low bed platform being hingedly connected to said first wheeled frame structure as well as to said wheeled dolly.

7. The invention in accordance with claim 6, and the remainder of said first wheeled frame structure including a bogie unit and a gooseneck unit having a forward upright section having a forward section releasably couplable with the rear section of the platform in defining the anchor means, and a horizontal and longitudinal draft section extending rearwardly in overlapping relation with and above the bogie unit and connected therewith.

8. The invention in accordance with claim 7, and pivot means coupling the draft section and the bogie unit for pivotal movement about a vertical axis of the bogie unit relative to the draft section.

9. The invention in accordance with claim 8, and steering means coupled to the bogie unit and the draft section and operable to provide for relative steering between the bogie unit and the gooseneck unit, the platform, and gooseneck structure.

10. The invention in accordance with claim 9, and steering means including power means for selectively controlling turning.

11. The invention in accordance with claim 3, and said coupling means and said anchoring means providing for selectable vertical positions of said platform.

* * * * *